US012698236B2

(12) United States Patent
Tsirigotis et al.

(10) Patent No.: US 12,698,236 B2
(45) Date of Patent: Aug. 4, 2026

(54) CEMENTITIOUS BINDERS FOR GEOPOLYMER, GEOPOLYMERS, AND USES THEREOF

(71) Applicant: SIKA TECHNOLOGY AG, Baar (CH)

(72) Inventors: Nikitas Tsirigotis, Lyndhurst, NJ (US); Gary Boon, Fair Lawn, NJ (US); Mohamed Cader, Cranford, NJ (US); Haripriya Nekkanti, Secaucus, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 326 days.

(21) Appl. No.: 18/221,700

(22) Filed: Jul. 13, 2023

(65) Prior Publication Data

US 2024/0018047 A1    Jan. 18, 2024

(30) Foreign Application Priority Data

Jul. 15, 2022    (EP) ..................................... 22185293

(51) Int. Cl.
 *C04B 28/08* (2006.01)
 *B28B 1/00* (2006.01)
 (Continued)

(52) U.S. Cl.
 CPC ............ *C04B 28/082* (2013.01); *B28B 1/001* (2013.01); *B33Y 70/10* (2020.01); *C04B 14/10* (2013.01);
 (Continued)

(58) Field of Classification Search
 CPC ....... C04B 28/082; C04B 14/10; C04B 18/08; C04B 18/146; C04B 28/065;
 (Continued)

(56) References Cited

U.S. PATENT DOCUMENTS 4,488,909 A      12/1984  Galer et al.
2011/0271876 A1    11/2011  Alter et al.
 (Continued)

FOREIGN PATENT DOCUMENTS

CN    101321710 A  * 12/2008  ............. C04B 41/89
EP    0 026 687 A2    4/1981
 (Continued)

OTHER PUBLICATIONS

The Possibility of fly ash and blast furnace slag disposal by using these environmental waste as substitute in portland cement Oguzhan Yavuz Bayraktar Environ Monis Asses (2019) 191:560 (Year: 2019).*

(Continued)

*Primary Examiner* — Pamela H Weiss

(74) *Attorney, Agent, or Firm* — Oliff PLC

(57) ABSTRACT

Binders for geopolymers, which include: a) not less than 30 w % of a mixture of at least two chemically different aluminosilicates, b) not less than 20 w % of Ordinary Portland cement, and c) 8-20 w % of a mixture of calcium sulfoaluminate cement or calcium aluminate cement with a source of calcium sulfate, wherein in the mixture the weight ratio of calcium sulfate to calcium sulfoaluminate and/or calcium aluminate is between 0.08-1.5, preferably 0.3-1.1, more preferably 0.6-1.1. Also, geopolymers using such binders as well as their use in various construction methods.

13 Claims, 1 Drawing Sheet

(51) Int. Cl.

| | |
|---|---|
| *B33Y 70/10* | (2020.01) |
| *C04B 14/10* | (2006.01) |
| *C04B 18/08* | (2006.01) |
| *C04B 18/14* | (2006.01) |
| *C04B 28/06* | (2006.01) |
| *C04B 41/00* | (2006.01) |
| *C04B 41/50* | (2006.01) |
| *C04B 111/00* | (2006.01) |
| *C04B 111/72* | (2006.01) |

(52) U.S. Cl.
CPC ............ *C04B 18/08* (2013.01); *C04B 18/146* (2013.01); *C04B 28/065* (2013.01); *C04B 41/009* (2013.01); *C04B 41/5081* (2013.01); *C04B 41/5083* (2013.01); *C04B 2111/00172* (2013.01); *C04B 2111/00181* (2013.01); *C04B 2111/00508* (2013.01); *C04B 2111/00577* (2013.01); *C04B 2111/00663* (2013.01); *C04B 2111/72* (2013.01)

(58) Field of Classification Search
CPC .............. C04B 41/009; C04B 41/5081; C04B 41/5083; C04B 2111/00172; C04B 2111/00181; C04B 2111/00508; C04B 2111/00577; C04B 2111/00663; C04B 2111/72; C04B 28/04; C04B 28/14; C04B 2111/23; C04B 2111/27; C04B 2111/34; C04B 28/006; C04B 28/06; B28B 1/001; B33Y 70/10; B33Y 10/00; B33Y 70/00; Y02P 40/10; Y02W 30/91
See application file for complete search history.

(56) References Cited

U.S. PATENT DOCUMENTS

| | | | | |
|---|---|---|---|---|
| 2012/0024196 A1 * | 2/2012 | Gong | ..................... | C04B 7/243 |
| | | | | 404/72 |
| 2013/0024196 A1 * | 1/2013 | Ganong, III | .......... | H04M 3/569 |
| | | | | 704/E17.001 |

| | | | | |
|---|---|---|---|---|
| 2013/0284070 A1 * | 10/2013 | Dubey | .................... | C04B 11/28 |
| | | | | 106/695 |
| 2019/0270671 A1 * | 9/2019 | Gaedt | ................. | C04B 40/0039 |
| 2020/0231503 A1 * | 7/2020 | Dubey | ............... | C04B 40/0608 |
| 2021/0238094 A1 * | 8/2021 | Frouin | ................... | C04B 28/08 |

FOREIGN PATENT DOCUMENTS

| | | | | | |
|---|---|---|---|---|---|
| EP | | 2842924 A1 * | 3/2015 | .......... | C04B 28/065 |
| EP | | 3458426 B1 * | 7/2022 | ............ | C04B 28/16 |
| WO | WO-2013163009 A1 * | | 10/2013 | .......... | C04B 12/005 |
| WO | | 2014/085538 A1 | 6/2014 | | |
| WO | WO-2019091888 A1 * | | 5/2019 | .......... | C04B 28/006 |
| WO | WO-2020053201 A1 * | | 3/2020 | ............ | C04B 28/26 |
| WO | WO-2020070093 A1 * | | 4/2020 | ............ | C04B 28/08 |
| WO | | 2022/007062 A1 | 1/2022 | | |
| WO | | 2022/122848 A1 | 6/2022 | | |
| WO | | 2022128472 A1 | 6/2022 | | |

OTHER PUBLICATIONS

Sustainability Article Granulated Blast Furance Slag and Coal Fly Ash Ternary Porltand Cement Optimization Sustainability 2020 12 5783 (Year: 2020).*

Ground Granulated Blast Furnace Slag and Fly Ash in Concrete Mixtures Natalie Peterson Becknell Miccah Hale Final Report AHTD TRC Transportation Research Committee (2006) (Year: 2006).*

CN101321710A Translation (Year: 2008).*

Feb. 13, 2023 Extended Search Report and Written Opinion issued in European Patent Application No. 22185293.2.

Zhuang et al., "Resistance of geopolymer mortar to acid and chloride attacks", Procedia Engineering, 2017, vol. 210, pp. 126-131.

Deb et al., "Drying Shrinkage of Slag Blended Fly Ash Geopolymer Concrete Cured at Room Temperature", Procedia Engineering, vol. 125, Jan. 1, 2015 (Jan. 1, 2015), pp. 594-600.

* cited by examiner

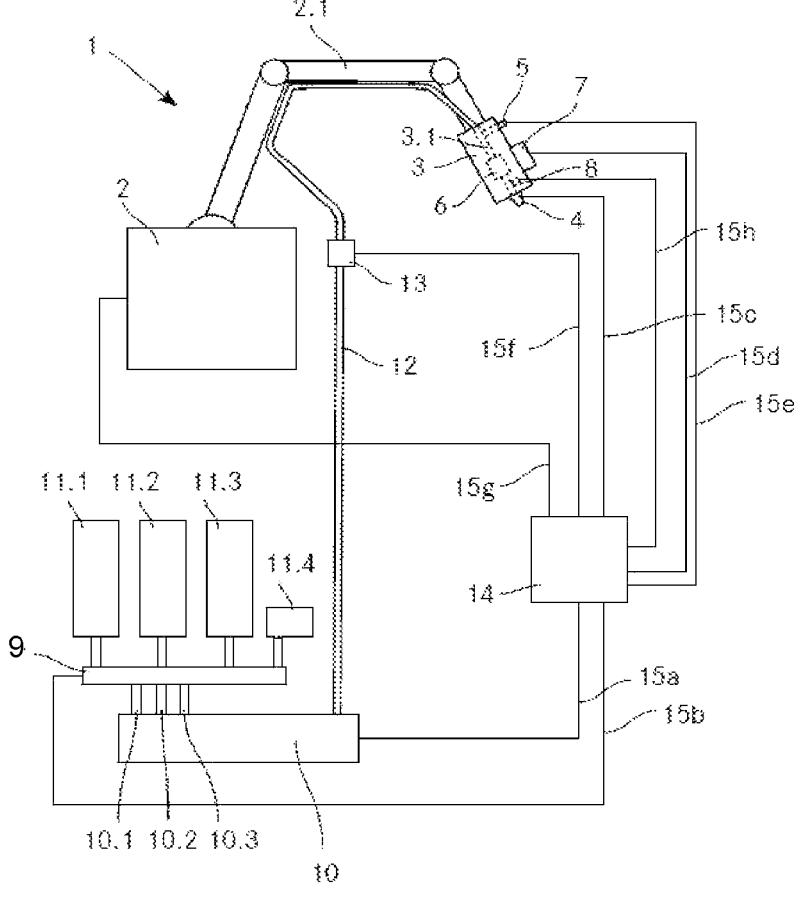

CEMENTITIOUS BINDERS FOR GEOPOLYMER, GEOPOLYMERS, AND USES THEREOF

TECHNICAL FIELD

The present invention relates to binders for geopolymers, which binders comprise at least two chemically different aluminosilicates, Portland cement, calcium sulfoaluminate cement or calcium aluminate cement and a source of calcium sulfate. The present invention also relates to geopolymers using such binders as well as their use in various construction methods.

BACKGROUND OF THE INVENTION

Geopolymers are known as an alternative to Portland cement-based building materials. The term "geopolymer" was originally used by Joseph Davidovits and respective materials have been proposed as early as 1981 (see for example EP0026687 assigned to J. Davidovits and CORDIS). Therein an alkaline silicate solution was reacted with silicon and aluminum in a source material of geological origin or in by-product materials such as fly ash to produce binders. Because the chemical reaction that takes place is a polymerization process, the term "geopolymer" is used for these binders. Since then, geopolymers generally consist of an aluminum silicate component and an alkali metal silicate component that react with one another in a geopolymerization reaction. Aluminum silicate components used include fly ash, slag and metakaolin.

Geopolymers are considered to be environmentally friendly building materials since the production of their starting materials gives rise to much less $CO_2$ as compared to the production of Portland cement.

Geopolymer compositions and especially geopolymer binders have been described in many publications. For example, US 2011/0271876 (S. Alter et al) discloses geopolymer compositions based on mixtures of blast furnace slag with bauxite, alumina slag or tailings and activated by alkaline silicates.

Geopolymers can exhibit fast setting and hardening properties and have high compressive strength in the cured state. Also, geopolymers were reported to have good resistance to chemical attack (see for example "Resistance of geopolymer mortar to acid and chloride attacks" by H. J. Zhuang et al in Procedia Engineering, 2017, Vol 210, p. 126-131).

However, geopolymers have also been reported to have less adhesion to materials such as aggregates or steel reinforcement. Also, geopolymers often show higher shrinkage as compared to Portland cement-based building materials. This has led to the development of geopolymer compositions with low shrinkage as disclosed for example in WO 2013/163009 (US Gypsum Company). This WO 2013/163009 discloses geopolymer compositions comprising a thermally activated aluminosilicate mineral, a calcium sulfoaluminate cement, and a source of calcium sulfate as a binder activated with alkali metal salts and/or alkali metal bases.

There is still a need for compositions which combine some of the advantages of geopolymers, such as high resistance to chemical attack, as well as of binders based on Portland cement, such as low shrinkage. The present invention therefore proposes novel cementitious binders for geopolymer and geopolymers to address this need.

SUMMARY OF THE INVENTION

It is an objective of the present invention to provide cementitious binders for geopolymers. It is another objective of the present invention to provide geopolymer compositions utilizing such cementitious binders. Especially the cementitious binders for geopolymers and thus also the geopolymer compositions using them should exhibit one or more of the following features:

(i) low autogenic or chemical shrinkage during hardening,
(ii) high compressive strength after hardening,
(iii) high resistance against chemical attack, especially against acid attack, sulfate attack, chloride attack, and/or salt-water attack in hardened state,
(iv) high freeze-thaw resistance in hardened state.

It was surprisingly found that a combination of Portland cement with at least two chemically different aluminosilicates as well as with a mixture of calcium sulfoaluminate cement or calcium aluminate cement with calcium sulfate is a suitable cementitious binder for geopolymers exhibiting such advantages.

Especially, it was found that a combination of at least two chemically different aluminosilicates with Portland cement led to an improved resistance of the cured composition towards chemical attack, especially acid attack. The combination of two chemically different aluminosilicates with Portland cement led to a higher resistance against chemical attack as compared to the use of each aluminosilicate alone.

Also surprisingly it was found that the resistance against chemical attack as well as the shrinkage behavior was optimized by the additional use of a mixture of calcium sulfoaluminate and/or calcium aluminate with a source of calcium sulfate in specific weight ratios.

The objective of the present invention is thus solved by a cementitious binder for geopolymer compositions as claimed in claim 1.

Other aspects of the present invention are the subject matter of the independent claims. Preferred embodiments are the subject matter of the dependent claims.

Ways for Carrying Out the Invention

In a first aspect the present invention relates to a cementitious binder for geopolymers, said cementitious binder comprising (in each case relative to the total dry weight of cementitious binder)

a) not less than 30 w % of a mixture of at least two chemically different aluminosilicates,
b) not less than 20 w % of Ordinary Portland cement, and
c) 8-20 w % of a mixture of calcium sulfoaluminate cement or calcium aluminate cement with a source of calcium sulfate, wherein in said mixture the weight ratio of calcium sulfate to calcium sulfoaluminate and/or calcium aluminate is between 0.08-1.5, preferably 0.3-1.1, more preferably 0.6-1.1.

Aluminosilicates within the present context are materials of pozzolanic and/or latent hydraulic nature having aluminosilicates as constituents. The chemical composition of aluminosilicates can be determined by XRF as described in standard EN 196-2:2013. Aluminosilicates of the present invention are mainly composed of silica ($SiO_2$ or "S" in cement notation), alumina ($Al_2O_3$ or "A" in cement chemistry notation), calcium oxide (CaO or "C" in cement chemistry notation), iron oxides ($Fe_2O_3$ or "F" in cement chemistry notation) and minor amounts of one or more of MgO, $SO_3$ ($ in cement chemistry notation), $TiO_2$, $P_2O_5$, $Na_2O$, $K_2O$, as determined by XRF analysis.

Examples of aluminosilicates of the present invention are steelmaking slags, fly ash of class F according to ASTM C618, clay minerals, especially calcined clays, vitreous pumices, vitreous volcanic ashes, zeolitized tuff, diatomaceous earth, burnt oil shale, and burnt residues of organic matter. According to preferred embodiments, a first aluminosilicate is steelmaking slag and further aluminosilicates are selected from fly ash of class F according to ASTM C618 and/or calcined clay.

Steel making slag within the present context is a by-product from the steelmaking process. Steel making slag is obtained for example in the Thomas process, the Linz-Donawitz process, the Siemens-Martin process or the electric arc furnace when iron is converted to steel. Steel making slag is generated when hot raw iron is treated with oxygen to remove carbon and other elements that have a higher affinity to oxygen than iron. Liquid slag is separated from the crude steel and cooled in pits or ground bays to form crystalline or partly crystalline steel making slag. The cooled slag may then be crushed, milled, and sieved to a desired fineness.

Steel making slag can be any slag resulting from the making of steel. Especially, steel making slag is any of granulated blast furnace slag (GGBFS), basic oxygen furnace slag (BOS), ladle slag or electric arc furnace slag. According to preferred embodiments, the steelmaking slag is ground granulated blast furnace slag. Especially preferably, the steelmaking slag, especially the GGBFS, has a Blaine fineness of at least 4000 $cm^2/g$, preferably at least 4500 $cm^2/g$, a glass content of at least 75%, and a weight ratio of $CaO+MgO/SiO_2+Al_2O_3$ of at least 1. Blaine fineness can be measured according to standard ASTM C204-18e1 or standard NF EN 196-6.

Clay minerals within the present context are solid materials composed to at least 30 w %, preferably to at least 45 w %, especially to at least 75 w %, each relative to dry weight, of clay minerals. Such clay minerals preferably belong to the kaolin group (such as kaolinite, dickite, nacrite or halloysite), the smectite group (such as montmorillonite, nontronite or saponite), the vermiculite group, serpentine, palygorskite, sepiolite, chlorite, talc, pyrophyllite, micas (such as biotite muscovite, illite, glauconite, celadonite, and phengite) or mixtures thereof. Clay minerals belonging to the kaolin group, especially kaolinite, and micas, especially muscovite and illite, as well as mixtures thereof are especially preferred. Clay minerals within the present context can be any type of clay mineral, for example crude clays, low-temperature calcined clays, or high-temperature calcined clays. Crude clays are clay minerals extracted from e.g. a quarry, optionally purified and optionally dried. Low-temperature calcined clays are clays that have been thermally treated at temperatures between 500-1200° C. For example, low-temperature calcined clay minerals may be produced in rotary kiln or in a flash calciner. High-temperature calcined clays are clay minerals that have been thermally treated at temperatures above 1200° C. and typically between 1300-1400° C. High-temperature calcined clays typically are crystalline or contain high amounts of crystalline phases, especially of mullite.

Clay minerals within the present context preferably are low-temperature calcined clays. A low-temperature calcined clay is a clay material that has been put to a heat treatment, preferably at a temperature between 500-1200° C., or in a flash calcination process at temperatures between 800-1100° C. A suitable flash calcination process is for example described in WO 2014/085538. According to especially preferred embodiments of the present invention, the calcined clay is metakaolin. Metakaolin is a material resulting from the low-temperature calcination of kaolinite or minerals that are rich in kaolinite, e.g. have a content of kaolinite of at least 30 w %, preferably to at least 35 w %, relative to its dry weight. Calcination temperatures for the manufacturing of metakaolin typically are in the range of 500-900° C.

The particle size of an aluminosilicate material of the present invention can be analyzed by sieve analysis as described for example in standard ASTM C136/C136M. The process separates fine particles from more course particles by passing the material through a number of sieves of different mesh sizes. The material to be analyzed is vibrated through a series of sequentially decreasing sieves using a single, or combination of horizontal, vertical or rotational motion. As a result, the percentage of particles retained on a sieve of a given size is given.

According to embodiments, a suitable particle size D50 of an aluminosilicate material of the present invention is between 1 μm and 100 μm, preferably 2 μm and 30 μm. A particle size D50 of a given material is the particle size where 50% of particles of this material are larger and 50% of particles are smaller. According to specific embodiments, the particle sizes D10 and D90 of an aluminosilicate material of the present invention are both between 0.5 μm and 100 μm, preferably 1 μm and 50 μm. A particle size D10 of a given material is the particle size where 90% of particles of this material are larger and 10% of particles are smaller and a particle size D90 is the particle size where 10% of particles are larger and 90% of particles are smaller.

A measure for the fineness of an aluminosilicate material of the present invention is the Blaine fineness. Blaine fineness can be measured according to standard ASTM C204-18e1 or standard NF EN 196-6.

According to embodiments, the Blaine surface of an aluminosilicate of the present invention, especially a steelmaking slag, is larger than 3000 $cm^2/g$, preferably larger than 4000 $cm^2/g$, more preferably larger than 4500 $cm^2/g$, still more preferably larger than 5000 $cm^2/g$, especially larger than 6000 $cm^2/g$. Typically, an aluminosilicate of the present invention has a Blaine fineness of smaller than 12000 $cm^2/g$.

It is important within the present context that at least two chemically different aluminosilicates are used in a cementitious binder for geopolymers. "Chemically different" means that the chemical composition of the respective aluminosilicates as determined by XRF as described in EN 196-2:2013 is different. It is possible to use two chemically different aluminosilicates in combination, or to use three chemically different aluminosilicates in combination, or to use four or more chemically different aluminosilicates in combination.

According to embodiments, the at least two chemically different aluminosilicates are fly ash of class F according to ASTM C618 and steelmaking slag, especially ground granulated blast furnace slag. Thus, according to embodiments, a cementitious binder of the present invention is characterized in that the at least two chemically different aluminosilicates are selected from steelmaking slag and fly ash of class F according to ASTM C618, preferably in a weight ratio of steelmaking slag to fly ash of between 1.5:1 to 1:2, preferably between 1.3:1 to 1:1.5.

According to further embodiments, the at least two chemically different aluminosilicates are fly ash of class F according to ASTM C618, steelmaking slag, especially ground granulated blast furnace slag, and a clay mineral, preferably a calcined clay, especially metakaolin.

According to further embodiments, in a cementitious binder of the present invention, two chemically different aluminosilicates are present selected from steelmaking slag, especially ground granulated blast furnace slag, and a clay mineral, preferably a calcined clay, especially metakaolin.

According to further embodiments, the at least two chemically different aluminosilicates are fly ash of class F according to ASTM C618 and a clay mineral, preferably a calcined clay, especially metakaolin.

The use of at least two chemically different aluminosilicates, especially a combination of fly ash of class F according to ASTM C618 and ground granulated blast furnace slag, or a combination of fly ash of class F according to ASTM C618, ground granulated blast furnace slag, and a calcined clay, especially metakaolin, or the combination of ground granulated blast furnace slag and a calcined clay, especially metakaolin, increases the resistance of a cementitious binder for geopolymers or of a geopolymer according to the present invention after hardening against acid attack.

The at least two chemically different aluminosilicates are present in a cementitious binder for geopolymers in an amount of not less than 30 w %, preferably between 30-70 w %, relative to the total dry weight of the cementitious binder. This weight percentage relates to the sum of all aluminosilicates present.

Ordinary Portland cement within the present context can be any one cement according to standard ASTM C150. Ordinary Portland cement can also be a cement of type CEM I or CEM II/A-L, B-L, A-LL, B-LL according to standard EN 197-1. Of course, equivalent cements according to alternative standards, for example, Japanese, Chinese, or Indian standards, are likewise suitable. White Portland cement is also a suitable type of Ordinary Portland cement.

Ordinary Portland cement is present in a cementitious binder for geopolymers in an amount of not less than 20 w %, preferably between 20-60 w %, relative to the total dry weight of the cementitious binder.

According to embodiments, in a cementitious binder of the present invention a weight ratio of Ordinary Portland Cement to the sum of the at least two thermally activated aluminosilicate is between 0.1-2, preferably 0.3-2, more preferably 0.6-1.6. For the calculation of this ratio, the sum of weight of all thermally activated aluminosilicates present is to be used.

A calcium sulfoaluminate cement (CSA cement) of the present invention is a cement comprising a clinker comprising $C_4(A_{3-x}F_x)\$$ (C: CaO; A: Al$_2$O$_3$; F: Fe$_2$O$_3$; \$: SO$_3$) where x is an integer of from 0-3. CSA of the present invention typically comprises further phases selected from aluminates (CA, C$_3$A, C$_{12}$A$_7$), belite (C$_2$S), ferrites (C$_2$F, C$_2$AF, C$_4$AF), ternesite (C$_5$S$_2$\$) and anhydrite. According to certain embodiments CSA of the present invention contains 15-75 w % C$_4$A$_3$\$, 0-10 w % aluminates, 0-70 w % belite, 0-35 w % ferrites, 0-20 w % ternesite, and 0-20 w % anhydrite, each based on the total dry weight of the CSA cement. Suitable CSA can, for example, be commercially obtained from Heidelberg Cement AG, Buzzi Unicem, or under the tradename Calumex from Caltra B.V.

A calcium aluminate cement (CAC) of the present invention preferably is a cement according to standard EN 14647: 2006-01. However, a calcium aluminate cement of the present invention may also be an amorphous material mainly composed of amorphous calcium aluminate phases.

The source of calcium sulfate can be any source of CaSO$_4$ anhydrite (also called anhydrite throughout this invention), CaSO$_4$ α- and β-hemihydrate, and CaSO$_4$ dihydrate. Sources of calcium sulfate are, for example, natural gypsum, phospho-gypsum, and FGD-gypsum. It has been found that anhydrite gives the best performance within the present context. Thus, according to preferred embodiments, in a cementitious binder of the present invention, the source of calcium sulfate is anhydrite.

The weight ratio of calcium sulfate to calcium sulfoaluminate and/or calcium aluminate in a cementitious binder of the present invention is between 0.08-1.5, preferably 0.3-1.1, more preferably 0.5-1.1. For the calculation of this ratio all calcium sulfate present in the cementitious binder must be taken into account. Calcium sulfate bound in aluminate phases, especially in $C_4(A_{3-x}F_x)\$$, is not to be considered as calcium sulfate for the calculation of this ratio. For the calculation of this ratio all useful calcium aluminate and calcium sulfoaluminate phases contained in the calcium sulfoaluminate cement or calcium aluminate cement must be considered. Such useful phases are as described above, especially useful phases are $C_4(A_{3-x}F_x)\$$ where x is an integer of from 0-3, CA, C$_3$A, C$_{12}$A$_7$, C$_2$AF, and/or C$_4$AF.

The weight ratio of calcium sulfate to calcium sulfoaluminate and/or calcium aluminate of between 0.08-1.5, preferably 0.3-1.1, more preferably 0.6-1.1 is important to ensure a high dimensional stability of the geopolymer upon hardening. A high dimensional stability especially means low autogenic or chemical shrinkage and less expansion. Shrinkage or expansion, as used throughout the present invention, is measurable according to standard ASTM C157/C157-M08.

As described above, according to embodiments, two chemically different aluminosilicates, selected from fly ash of class F according to ASTM C618 and steelmaking slag, especially ground granulated blast furnace slag, are present in a cementitious binder of the present invention. Especially in such embodiments, the presence of calcium sulfate and calcium sulfoaluminate and/or calcium aluminate in the specified weight ratio helps to ensure that the targeted resistance against chemical attack of the geopolymer composition after hardening is achieved.

According to embodiments, a cementitious binder of the present invention additionally comprises 5-15 w %, preferably 6-8 w % of silica fume, relative to the total dry weight of cementitious binder. The additional use of silica fume further increases the resistance of a cementitious binder for geopolymers or of a geopolymer according to the present invention after hardening against acid attack. Additionally, it has been found that the use of silica fume can improve the adhesion of a cementitious binder of the present invention or geopolymer composition of the present invention during shotcreting and/or in vertical or overhead applications.

According to embodiments, a cementitious binder for geopolymers comprises or consists of (in each case relative to the total dry weight of cementitious binder)
a) 30-70 w % of a mixture of at least two chemically different aluminosilicates,
b) 20-60 w % of Ordinary Portland cement, and
c) 8-20 w % of a mixture of calcium sulfoaluminate cement or calcium aluminate cement with a source of calcium sulfate, wherein in said mixture the weight ratio of calcium sulfate to calcium sulfoaluminate and/or calcium aluminate is between 0.08-1.5, preferably 0.3-1.1, more preferably 0.6-1.1.

According to particularly useful embodiments, a cementitious binder for geopolymers comprises or consists of (in each case relative to the total dry weight of cementitious binder)
a) not less than 30 w % of a mixture of fly ash of class F according to ASTM C618, steelmaking slag, especially ground granulated blast furnace slag, and a clay mineral, preferably a calcined clay, especially metakaolin,
b) not less than 20 w % of Ordinary Portland cement,
c) 8-20 w % of a mixture of calcium sulfoaluminate cement or calcium aluminate cement with a source of calcium sulfate, wherein in said mixture the weight ratio of calcium sulfate to calcium sulfoaluminate and/or calcium aluminate is between 0.08-1.5, preferably 0.3-1.1, more preferably 0.5-1.1, and d) 5-15 w %, preferably 6-8 w % of silica fume.

According to further particularly useful embodiments, a cementitious binder for geopolymers comprises or consists of (in each case relative to the total dry weight of cementitious binder)

a) 40-50 w % of a mixture of ground granulated blast furnace slag, and a clay mineral, preferably a calcined clay, especially metakaolin, b) 20-30 w % of Ordinary Portland cement, and c) 14-20 w % of a mixture of calcium sulfoaluminate cement or calcium aluminate cement with a source of calcium sulfate, wherein in said mixture the weight ratio of calcium sulfate to calcium sulfoaluminate and/or calcium aluminate is between 0.08-1.5, preferably 0.3-1.1, more preferably 0.6-1.1.

According to embodiments, in a cementitious binder of the present invention, and where silica fume, calcined clay, and fly ash of class F according to ASTM C618 are present, a weight ratio of the sum of silica fume and calcined clay to fly ash is between 0.1-0.5. Thereby, the sum of silica fume and calcined clay refers to the combined weight of silica fume and calcined clay present in the composition.

It is preferred that a cementitious binder for geopolymers or a geopolymer of the present invention does not comprise any alkali silicates, especially does not contain sodium silicate or potassium silicate.

In a second aspect the present invention refers to a geopolymer composition comprising a) a cementitious binder as described above, b) aggregates and/or fillers, c) optionally further additives.

Aggregates can be any material that is non-reactive in the hydration reaction of hydraulic binders. Aggregates can be any aggregate typically used for cementitious compositions. Typical aggregates are for example rock, crushed stone, gravel, sand, especially quartz sand, river sand and/or manufactured sand, recycled concrete, glass, expanded glass, hollow glass beads, glass ceramics, perlite, vermiculite, quarry wastes, raw, fired, or fused earth or clay, porcelain, electro fused or sintered abrasives, firing support, silica xerogels, or bio-based aggregates such as plant materials. Fillers are fine aggregates. Fillers especially are ground limestone, ground dolomite, and/or ground aluminum oxide.

An especially preferred aggregate is sand. Sand is a naturally occurring granular material composed of finely divided rock or mineral particles. It is available in various forms and sizes. Examples of suitable sands are quartz sand, limestone sand, river sand or crushed aggregates. Suitable sands are for example described in standards ASTM C778 or EN 196-1.

Further additives may be any other additives common in the mortar and/or concrete industry such as for example plasticizers and/or superplasticizers, air entrainers, defoamers, stabilizers, rheology modifiers, especially thickeners, water reducers, accelerators, retarders, shrinkage reducing agents, activators, accelerators, water resisting agents, strength enhancing additives, fibers, dedusting agents, blowing agents, pigments, corrosion inhibitors, biocides, and/or chromium(VI) reducers. It can be advantageous to combine two or more of the mentioned further additives in one cementitious composition. Especially, thickeners, superplasticizers, accelerators, and retarders.

According to embodiments, further additives are selected from lithium carbonate, alkali silicates, especially sodium silicate or potassium silicate, citric acid, tartaric acid, sugars, sugar acids, sugar alcohols, aluminum sulfate, modified cellulose, organosilanes, glycols, magnesium oxide, calcium oxide, calcium silicate hydrates, phosphates, polycarboxylate ethers, naphthalene sulfonates, lignin sulfonates, and/or melamine formaldehyde condensates.

According to embodiments, a geopolymer composition of the present invention comprises a cementitious binder as described above in an amount of 20-60 w %, preferably 30-45 w %, aggregates and/or fillers in an amount of 40-70 w %, preferably 50-65 w %, and further additives in an amount of 0-10 w %, preferably 0.1-5 w %, in each case relative to the total dry weight of the geopolymer composition According to embodiments, a geopolymer composition of the present invention is a dry composition. A dry composition means that the content of water is below 5 w %, preferably below 1 w %, relative to the total weight of the composition.

A dry geopolymer composition of the present invention may be mixed with water. Setting and hardening of the geopolymer composition starts upon contact with water. Suitable weight ratios of water to cementitious binder in the geopolymer composition are between 0.2-0.7, preferably 0.3-0.5.

According to embodiments, a geopolymer composition of the present invention is a wet geopolymer composition. A wet geopolymer composition comprises a) a cementitious binder as described above, b) aggregates and/or fillers, c) optionally further additives, and d) water in an amount to realize a weight ratio of water to cementitious binder of between 0.2-0.7, preferably 0.3-0.5.

All embodiments described as preferred above also relate to this aspect.

Cementitious binders of the present invention and geopolymers based on such binders may be used in various construction methods.

In a further aspect, the present invention relates to a method for the repair of concrete or mortar structures or of masonry, said method comprising the steps of a) providing a cementitious binder as described above or a geopolymer composition as described above, b) mixing the cementitious binder or the geopolymer composition provided in step a) with water, c) applying the mixture obtained in step b) to the surface of a hardened concrete or mortar structure, and d) optionally hardening the applied mixture.

Mixing in step b) can be done by any means known to the skilled person. For example, mixing can be done by means of a handheld agitator, Hobart mixer, mixing bucket, paddle mixer, jet mixer, screw mixer, auger mixer, horizontal single shaft mixer, twin shaft paddle mixer, vertical shaft mixer, ribbon blender, orbiting mixer, change-can mixer, vertical agitated chamber or air agitated operations. Mixing can be continuously, semi-continuously or batch-wise. Continuous mixing offers the advantage of a high material throughput.

Application in step c) is possible by any means known to the person skilled in the art. According to embodiments, the mixture is applied in step c) by means of a trowel, brush or roller. According to other embodiments, the mixture is applied in step c) by means of spray equipment. Spraying has the advantage that the application can be done very quickly and in a continuous manner. Suitable equipment for spray applications is known to the person skilled in the art. The mixture can be applied in step c) in various thickness, depending on the actual need. It is also possible to apply the mixture in step c) in a manner to fill holes or cracks.

Hardening in step d) is typically done by leaving the applied mixture under environmental conditions. Thus, according to embodiments, hardening is done at temperatures between 5-35° C. and appr. 1023 mbar pressure. According to other embodiments, hardening is done at elevated temperatures, for example at temperatures above 40° C. and up to 100° C. or 120° C.

According to embodiments, a method for the repair of concrete or mortar structures or of masonry is a method conforming to principles of standard EN 1504-9:2008. Especially, a method for the repair of concrete or mortar structures or of masonry is a method conforming to principle 2, in particular 2.2, principle 3, in particular 3.1 and 3.3, principle 4, in particular 4.4, 4.5, 4.6, principle 5, in particular 5.1 and 5.3, principle 6, principle 7, in particular 7.1, or principle 8, in particular 8.2 according to standard EN 1504-9:2008.

In particular, a method for the repair of concrete or mortar structures or of masonry of the present invention is suitable in environments where there is contact with aggressive chemicals, especially aqueous acids, sulfates, chlorides, and/or salt water.

In a further aspect, the present invention relates to a method for the protection of a structure, especially of a concrete or mortar structure or of a masonry structure, said method comprising the steps of
    a) providing a cementitious binder as described above or a geopolymer composition as described above,
    b) mixing the cementitious binder or the geopolymer composition provided in step a) with water,
    c) applying the mixture obtained in step b) to the surface of the hardened structure, and
    d) optionally hardening the applied mixture.

Especially, in a method for the protection of a structure, mixing, applying, and hardening may be performed in a way as described above.

A structure to be treated in a method for protection of the present invention may be a structure which is permanently dry, which is frequently wetted, for example a wet room, or which is permanently in contact with water. For example, a structure to be treated may be part, for example the floor, walls and/or ceiling, of a balcony, a bathroom, a kitchen, a swimming pool, a harbor structure, a water pipe, a water tank, a sewer structure, a sewer pipe, a manhole, a lift station, a pumping station, a collector, a wastewater treatment plant, a coastal area or a bridge deck.

In particular, a method for the protection of a structure of the present invention is suitable in environments where there is contact with aggressive chemicals, especially aqueous acids and/or salt water.

In a further aspect, the present invention relates to a method for the waterproofing of a structure, especially of a concrete or mortar structure or of a masonry structure, said method comprising the steps of
    a) providing a cementitious binder as described above or a geopolymer composition as described above,
    b) mixing the cementitious binder or the geopolymer composition provided in step a) with water,
    c) applying the mixture obtained in step b) to the surface of the hardened structure, and
    d) optionally hardening the applied mixture.

Especially, in a method for the waterproofing of a structure, mixing, applying, and hardening may be performed in a way as described above.

The term "waterproofing" within the present context includes both, waterproofing and damp proofing as defined in ACI 515.1R-85.

A structure to be treated in a method for waterproofing of the present invention may be a structure which is permanently dry, which is frequently wetted, for example a wet room, or which is permanently in contact with water. For example, a structure to be treated may be part, for example the floor, walls and/or ceiling, of a balcony, a bathroom, a kitchen, a swimming pool, a harbor structure, a water pipe, a water tank, a sewer structure, a sewer pipe, a manhole, a lift station, a pumping station, a collector, a wastewater treatment plant, a coastal area or a bridge deck.

In particular, a method for the waterproofing of a structure of the present invention is suitable in environments where there is contact with aggressive chemicals, especially aqueous acids and/or salt water.

In a further aspect, the present invention relates to a method for the 3D printing of a mortar composition, said method comprising the steps of
    a) providing a cementitious binder as described above or a geopolymer composition as described above,
    b) mixing the cementitious binder or the geopolymer composition provided in step a) with water,
    c) optionally conveying the mixture obtained in step b) to a print head, preferably a print head mounted on a moveable arm,
    c) applying the mixture obtained in step b) from a print head layer by layer to form a 3 dimensional object, and
    d) optionally hardening the 3 dimensional object.

According to preferred embodiments, in a method for the 3D printing of the present invention, a cementitious binder or a geopolymer composition are used where the two chemically different aluminosilicates are selected from steelmaking slag, especially ground granulated blast furnace slag, and a clay mineral, preferably a calcined clay, especially metakaolin. A preferred weight ratio of steelmaking slag, especially ground granulated blast furnace slag, to clay mineral, preferably calcined clay, especially metakaolin in a cementitious binder for geopolymer to be used in a method for the 3D printing is between 2:1 and 5:1, especially 3.5:1. It can be additionally preferable that the total amount of clay mineral, preferably calcined clay, especially metakaolin, in a cementitious binder for geopolymer to be used in a method for the 3D printing is not higher than 20 w %, preferably not higher than 16 w %, more preferably not higher than 11 w %. A higher amount especially of metakaolin may lead to poor extrusion and higher pressure during extrusion. Additionally, fly ash may be present.

Especially, in a method for the 3D printing of a mortar composition, mixing, applying, and hardening may be performed in a way as described above.

In particular, the method for the 3D printing of a mortar composition can be performed with a device as described in the following. Thus, any features described in the following in connection with the device can be implemented in the method described above accordingly.

According to embodiments, a device for producing a 3-dimensional object in a method of the present invention, especially a robotic system, comprises a supply device for the cementitious binder or a geopolymer composition mixed up with water, a supply line for supplying the cementitious binder or a geopolymer composition mixed up with water to the print head, a mixing unit, and a control unit.

Preferably, the mixing unit is a static and/or dynamic mixer and is arranged downstream the supply device and upstream the outlet nozzle. Especially, the mixing unit is arranged such that the cementitious binder or a geopolymer composition mixed up with water is mixed before entering the supply line, when passing the supply line, and/or after leaving the supply line.

The device comprises a print head, which preferably is movable in at least one spatial direction to form the 3-dimensional structure. The print head has a print head outlet, especially an outlet nozzle, to apply the cementitious binder or a geopolymer composition mixed up with water. If desired, the print head can comprise a controllable outlet, especially in the form of an openable and closable outlet nozzle. In this case, the openable and closable outlet nozzle preferably is controllable with the control unit.

According to embodiments, the device comprises at least one mixer, especially a static and/or dynamic mixer, which is arranged downstream the supply device for adding an additive into the cementitious binder or a geopolymer composition mixed up with water. In particular, the at least one mixer is arranged between (i) the print head outlet, especially the outlet nozzle, and (ii) the supply device and the inlet nozzle for adding an additive into the cementitious binder or a geopolymer composition mixed up with water. In a further preferred embodiment, the device comprises an additive supply device, optionally with an additive inlet nozzle, which is configured for adding an additive to the cementitious binder or a geopolymer composition mixed up with water in the print head, in the mixing device and/or in the supply line upstream the print head.

According to embodiments, the control unit of the device includes a processor, a memory unit, and a plurality of interfaces for receiving data and a plurality of interfaces for controlling individual components of the device.

FIG. 1 schematically shows an exemplary system 1 for carrying out a method for the 3D printing according to the invention.

The system 1 comprises a movement device 2 with a movable arm 2.1. A print head 3 is attached to the free end of the arm 2.1, which can be moved by the arm 2.1 in all three spatial dimensions. This allows the print head 3 to be moved to any position in the working area of the movement device 2.

Inside, the print head 3 has a tubular passage 3.1 extending from the end face facing the arm 2.1 (at the top in FIG. 1) to the opposite and free end face for the passage of mixture of cementitious material with water. At the free end, the passage 3.1 opens into a controllable outlet 4 in the form of a nozzle which may be continuously openable and closable.

According to some embodiments, an inlet nozzle 5 for adding an additive opens laterally into the passage 3.1 in a region facing the arm 2.1. Through the inlet nozzle an additive, for example a rheological aid, can be added to the mixture of cementitious material with water moving through the passage 3.1 as required.

According to embodiments, inside the print head 3 downstream with respect to the inlet nozzle, a static mixer 6 is arranged in the passage 3.1, which additionally mixes the mixture of cementitious material with water and the optional additive.

In the area of the controllable outlet 4, a measuring unit 8 may be arranged for determining the pressure in the tubular passage 3.1. A sampling rate of the measuring unit 8 is, for example, 10 Hz.

According to certain embodiments, a device 7 for deaerating the mixture of cementitious material with water is also attached to the print head 3. The device is designed as a vacuum treatment device and makes it possible to reduce the air content in the mixture of cementitious material with water. For this purpose, for example, a section of the wall of the passage 3.1 can be designed as a gas-permeable membrane, so that air is drawn out of the mixture of cementitious material with water by applying a vacuum outside the passage 3.1.

The system 1 for applying a mixture of cementitious material with water has a feed device 9 which corresponds on the input side with containers 11.1, 11.2, and optionally 11.3 as well as 11.4. Container 11.1 contains the first component, which is a cementitious composition for geopolymer or a geopolymer composition according to the present invention. The second component, which is present in the second container 11.2, consists of water. The third component is optional. In the optional additive reservoir 11.4 there is optionally present, for example, a rheological aid On the output side, the feed device 9 has at least two, optionally three separate outlets, each of which is connected to one of inlets 10.1, 10.2, and optionally 10.3 of a mixing device 10. The feed device 9 also has individually controllable metering devices (not shown in FIG. 1), so that the individual components in the individual containers 11.1, 11.2, and optionally 11.3 as well as 11.4 can be metered individually into the mixing device 10.

According to embodiments, the mixing device 10 is designed as a static mixer or as a dynamic mixer, preferably as a continuous dynamic mixer and may comprise, in addition thereto, an integrated conveying device in the form of a screw conveyor. In the mixing device, the individually metered components are mixed together and conveyed into the flexible line 12 attached to the outlet side of the mixing device.

The mixture of cementitious material with water can be conveyed into the print head 3 via the flexible line 12, which opens into the tubular passage 3.1 at the end of the print head facing the arm 2.1, and continuously applied through the controllable outlet 4.

Optionally also part of the system 1 is a measuring unit 13, which is integrated into the delivery line 12 in the area between the mixing device 10 and the print head 3. The measuring unit includes, for example, an ultrasonic transducer which is designed to determine the flow properties of the mixture of cementitious material with water. A sampling rate of the measuring unit 13 is, for example, 10 Hz.

A central control unit 14 of the system 1 includes a processor, a memory unit, and a plurality of interfaces for receiving data and a plurality of interfaces for controlling individual components of the system 1.

In this regard, the mixing device 10 is connected to the control unit 14 via a first control line 15a, while the feeding device is connected to the control unit 14 via a second control line 15b. As a result, the individual components in the containers 11.1, 11.2, and optionally 11.3 can be metered into the mixing device 10 via the central control unit in accordance with predetermined recipes stored in the control unit and conveyed into the flexible line 12 at adjustable conveying rates.

The controllable outlet 4, the inlet nozzle 5, and optionally the device 7 for deaerating the mixture of cementitious material with water at the print head are each connected to the control unit 14 via a separate control line 15c, 15d, 15e as well and can be controlled or monitored by the latter.

The movement device 2 is also connected to the control unit 14 via a further control line 15g. This means that the movement of the print head 3 can be controlled via the control unit 14.

The measuring unit 8, if present, is connected to the control unit 14 by a data line 15h, so that print data recorded in the measuring unit can be transmitted to the control unit 14.

Similarly, the measuring unit 13, if present, is connected to the control unit 14 by a data line 15f, so that data recorded in the measuring unit characterizing the flow properties can be transmitted to the control unit 14.

In a further aspect, the present invention relates to a method for shotcreting, said method comprising the steps of a) providing a cementitious binder as described above or a geopolymer composition as described above, b) mixing the cementitious binder or the geopolymer composition provided in step a) with water, c) conveying the mixture obtained in step b) to a gun, d) optionally intermixing an additional accelerator to the mixture obtained in step b), c) spraying the mixture from said gun into a cavity and/or onto a surface, and d) optionally hardening the mixture.

According to embodiments, the additional accelerator added in step d) is an accelerator for shotcrete, especially a composition based on aluminum sulfate.

Preferably, a composition based on aluminum sulfate is added to a mixture prepared in step b) during conveying or in the gun.

Suitable guns for spraying the mixture in step c) are known to the skilled person. Especially, a suitable gun is a conventional gun for shotcrete (also termed spray concrete), preferably with a spray nozzle.

According to embodiments, in a method for shotcreting according to the present invention a substrate is coated. In particular, the substrate is a surface of a tunnel, mine, excavation, bay, well and/or drain. According to further embodiments, in a method for shotcreting according to the present invention a cavity is filled. According to further embodiments, in a method for shotcreting according to the present invention free-form structures are being built.

FIGURES

FIG. 1 System for 3D printing of a mortar composition.
1 System for 3D printing of a mortar composition
2 Movement device
2.1 Movable arm
3 Print head
3.1 Passage
4 Outlet
5 Inlet nozzle
6 Static mixer
7 Deaerating device
8 Measuring unit
9 Feed device
10 Mixing device
10.1-10.3 Inlets
11.1-11.4 Containers
12 Flexible line
13 Measuring unit
14 Control unit
15a-15h Control line, data line

EXAMPLES

The following table 1 gives an overview of the chemical composition of some of the raw materials used.

TABLE 1 chemical composition and fineness of fly ash, ground granulated blast furnace slag, metakaolin, and silica fume used

| | $SiO_2$* | $Al_2O_3$* | $Fe_2O_3$* | CaO* | MgO* | $SO_3$* | Fine-ness** |
|---|---|---|---|---|---|---|---|
| Class F fly ash (FA) | 51.9 | 23.3 | 14.8 | 2.3 | 0.9 | 0.53 | 20.8% |
| GGBS | 36.5 | 10.9 | 0.6 | 38.8 | 11.3 | 2.3 | 0.9% |
| Metakaolin (MK) | 50.0 | 41.3 | 1.7 | 0.2 | 0.2 | 0.05 | 1.8% |
| Silica Fume (SF) | 95.9 | 0.1 | 0.1 | 0.5 | 0.2 | 0.25 | 2.0% |

*determined by XRF as described in EN 196-2:2013
**amount retained on #325 sieve White Ordinary Portland Cement Type I (w-PC) with a Blaine fineness of 4280 cm2/g from the company Royal White Cement was used.

Calcium sulfoaluminate cement (CSA) with an amount of 69.4 w % $C_4A_3\$$, 2.6 w % anhydrite, and <25 w % $C_2S$ was used.

Calcium sulfate used was anhydrite.

Sand used is a mixture of silica sand with particle size 0.1-2.5 mm.

Fine filer used was ground feldspar with an average particle size of 45 microns. Polycarboxylate ether (PCE) of type Melflux 6681 supplied by Azelis Americas Inc was used as an additive.

Example 1—Geopolymer Tests

To make cementitious binders for geopolymer or geopolymer formulations, the dry ingredients were weighed into a Hobart mixer in the amounts indicated in below tables 2-5 and mixed for 3 minutes at 23° C. and 50% relative humidity. Water was then added to realize a weight ratio of cementitious binder to water (ratio w/b) as indicated in below tables 2-5 and mixing continued for another 3 minutes. Test specimen were cast directly from the resulting geopolymer compositions. Measurements were performed as follows.

Shrinkage was measured according to standard ASTM C157/C157-M08 after 24 hours curing at 23° C./50% r.h. A shrinkage of 1500 µm/m or less was desired. Expansion (indicated by positive values in below tables 2-5) is preferable over shrinkage within the present context.

Compressive strength (termed C.S. in below tables 2-5) was determined according to standard ASTM C109/C109M using cylinders of 25.4 mm height and 25.4 mm diameter. Compressive strength was measured after curing the test specimen for 7 d at 23° C./90% r.h. and subsequently for 7 d immersed in tap water.

Acid resistance (termed A.R. in below tables 2-5) was measured by comparison of compressive strength of test specimen. For the comparison, a first specimen from each mix was prepared according to ASTM C109/C109M as described above. A second test specimen from each mix was prepared according to the same procedure, but instead of curing for 7 d at 23° C./90% r.h. and subsequently for 7 d immersed in tap water, this second test specimen was cured for 7 d at 23° C./90% r.h. and subsequently for 7 d immersed in 0.5 M sulfuric acid. The difference in compressive strength between the two respective test specimen was calculated and is reported below as a difference in % (a negative value indicating loss of compressive strength during storage in acid, a positive value indicating gain of compressive strength during acid storage).

For ease of reference, the calculated weight ratio of calcium sulfate to calcium sulfoaluminate (ratio C$: CSA) is given in the below table 2-5 for each mixture.

Compositions C-1 to C-9 are not according to the present invention and are included for comparative purposes. Compositions G-1 to G-13 are according to the present invention.

silicates in combination with a binder based on Portland cement, CSA, and calcium sulfate, that increase the acid resistance and yet shows low shrinkage.

Also, an increase in the ratio of weight ratio of calcium sulfate to calcium sulfoaluminate the shrinkage is improved (examples G-2 to G-4).

The partial replacement of fly ash by metakaolin and silica fume additionally increased the acid resistance.

TABLE 2

| | comparative mixtures C-1 to C-8 and results | | | | | | |
|---|---|---|---|---|---|---|---|
| | C-1 | C-2 | C-3 | C-4 | C-6 | C-7 | C-8 |
| FA [g] | | | 17 | 11 | 25 | | 13 |
| GGBS [g] | 13 | | | 15 | | 25 | 12 |
| w-PC [g] | | 39 | 22 | 14 | 10 | 10 | 10 |
| MK [g] | 15 | | | | | | |
| CSA [g] | | | | | 4 | 4 | 5.6 |
| CaSO$_4$ [g] | | | | | 1.7 | 1.7 | |
| Sand [g] | 60 | 59 | 59 | 57.9 | 57.2 | 57.2 | 57.3 |
| Filler [g] | | 2 | 2 | 2 | 2 | 2 | 2 |
| PCE [g] | | | | 0.1 | 0.1 | 0.1 | 0.1 |
| ratio C$: CSA | n.d. | n.d. | n.d. | n.d. | 0.65 | 0.65 | 0.04 |
| ratio w/b | 0.41* | 0.41 | 0.41 | 0.41 | 0.39 | 0.39 | 0.39 |
| Shrinkage [μm/m] | −6200 | n.a. | n.a. | −1700 | n.a. | n.a. | −900 |
| C.S. [psi] | 4099 | 5114 | 5978 | 5457 | 2286 | 7288 | n.a. |
| A.R. [%] | +1.5 | −32.1 | −41.9 | −42.3 | −15.6 | −21.7 | n.a. |

*used 23 parts potassium silicate solutiuon (47% solids content)
n.d.: not determined
n.a.: not available It can be seen from the above examples, that a geopolymer composition according to the teachings of Davidovits (C-1) does result in good strength and acid resistance but also shows very high shrinkage. The use of Portland cement based binders decreased the shrinkage, but also decreased the acid resistance (examples C-2 to C-4). The combined use of Portland cement, CSA, and calcium sulfate without aluminosilicate also led to acceptable shrinkage but low acid resistance. Interestingly, the use of only one aluminosilicate with the Portland cement, CSA, calcium sulfate based binder was not sufficient to yield high strength and at the same time increase the acid resistance (cf examples C-6 and C-7).

The use of CSA alone, without the anhydride, did lead to low shrinkage but not to the desired acid resistance.

TABLE 3

| | geopolymer mixtures G-1 to G-6 and results | | | | | |
|---|---|---|---|---|---|---|
| | G-1 | G-2 | G-3 | G-4 | G-5 | G-6 |
| FA [g] | 11 | 13 | 13 | 13 | 13 | 10 |
| GGBS [g] | 14 | 12 | 12 | 12 | 12 | 12 |
| w-PC [g] | 9 | 10 | 10 | 10 | 10 | 10 |
| MK [g] | | | | | | 1.5 |
| SF [g] | | | | | | 1 |
| CSA [g] | 3.6 | 5.9 | 4.8 | 4 | 4.4 | 4 |
| CaSO$_4$ [g] | 1.6 | 1.3 | 0.8 | 1.5 | 1.2 | 1.7 |
| Sand [g] | 58.7 | 55.7 | 57.3 | 57.4 | 57.4 | 57.7 |
| Filler [g] | 2 | 2 | 2 | 2 | 2 | 2 |
| PCE [g] | 0.1 | 0.1 | 0.1 | 0.1 | 0.1 | 0.1 |
| ratio C$: CSA | 0.68 | 0.36 | 0.28 | 0.58 | 0.43 | 0.65 |
| ratio w/b | 0.39 | 0.39 | 0.39 | 0.39 | 0.39 | 0.39 |
| Shrinkage [μm/m] | n.a. | −1050 | −1400 | +800 | n.a. | n.a. |
| C.S. [psi] | 4710 | n.a. | n.a. | 5537 | 5344 | 5905 |
| A.R. [%] | −13.8 | n.a. | n.a. | −20.9 | −16.7 | n.a. | n.a.: not available

It can be seen from the results of table 3, that it is the combination of at least two chemically different alumino-

TABLE 4

| | geopolymer mixtures G-7 to G-9 and results | | | |
|---|---|---|---|---|
| | G-7 | G-8 | G-9 | G-10 |
| FA [g] | 13 | 13 | 13 | 14 |
| GGBS [g] | 12 | 12 | 12 | 9 |
| w-PC [g] | 10 | 10 | 10 | 11 |
| CSA [g] | 4 | 4 | 4 | 4.3 |
| CaSO$_4$ [g] | 1.3 | 1.5 | 1.7 | 1.9 |
| Sand [g] | 55.6 | 57.4 | 57.2 | 57.7 |
| Filler [g] | 2 | 2 | 2 | 2 |
| PCE [g] | 0.1 | 0.1 | 0.1 | 0.1 |
| ratio C$: CSA | 0.51 | 0.58 | 0.65 | 0.67 |
| ratio w/b | 0.37 | 0.37 | 0.37 | 0.39 |
| Shrinkage [μm/m] | −850 | −800 | +100 | n.a. |
| C.S. [psi] | 4425 | 4305 | 3805 | 4017 |
| A.R. [%] | n.a. | n.a. | n.a. | −4.9 | n.a.: not available

From the results of above table 4 it can be seen that with increasing weight ratio of calcium sulfate to calcium sulfoaluminate the shrinkage is improved (examples G-7 to G-9).

Also, from a comparison of results from tables 3 and 4 (cf examples G-1 and G-10) it can be seen that an increase in the weight ratio of GGBS to fly ash leads to increased strength but lower acid resistance. However, it has to be mentioned that acid resistance was acceptable in both these examples.

TABLE 5

| | comparative mixture C-9 and geopolymer mixtures G-10 to G-13 and results | | | | |
|---|---|---|---|---|---|
| | C-9 | G-10 | G-11 | G-12 | G-13 |
| FA [g] | | | 3.2 | 5.6 | |
| GGBS [g] | 11.2 | 8 | 8 | 5.6 | 7.4 |
| MK [g] | | 3.2 | | | 2.9 |

17

TABLE 5-continued comparative mixture C-9 and geopolymer
mixtures G-10 to G-13 and results

| | C-9 | G-10 | G-11 | G-12 | G-13 |
|---|---|---|---|---|---|
| w-PC [g] | 8.7 | 8.7 | 8.7 | 8.7 | 8.7 |
| SF [g] | | | | | 1 |
| CSA [g] | 1.2 | 1.2 | 1.2 | 1.2 | 1.2 |
| CaSO$_4$ [g] | 1.2 | 1.2 | 1.2 | 1.2 | 1.2 |
| Sand [g] | 75 | 75 | 75 | 75 | 75 |
| Filler [g] | 2.3 | 2.3 | 2.3 | 2.3 | 2.3 |
| PCE [g] | 0.1 | 0.1 | 0.1 | 0.1 | 0.1 |
| ratio C\$: CSA | 1.0 | 1.0 | 1.0 | 1.0 | 1.0 |
| ratio w/b | 0.15 | 0.15 | 0.15 | 0.15 | 0.15 |
| Shrinkage [μm/m] | −1500 | −300 | −164 | −107 | −156 |
| C.S. [psi] | 2102 | 3686 | 3381 | 3160 | 4072 |
| A.R. [%] | n.a. | +5.9 | −18.1 | −10.9 | +1.3 | n.a.: not available

It can be seen from the results in table 5 that compositions according to the invention have significantly lower shrinkage and higher compressive strength as compared to a reference. A binder having a combination of GGBS and fly ash led to lower shrinkage but also slightly lower compressive strength as compared to a binder having a combination of GGBS and metakaolin (cf examples G-10 and G-11). The addition of additional silica fume can further reduce the shrinkage and increase the compressive strength and acid resistance (cf examples G-13 and G-10). A balanced ratio of GGBS to fly ash can also further reduce the shrinkage and improve the acid resistance (cf examples G11 and G-12).

Example 2—3D Printing

A geopolymer composition was 3D printed with a system as described in FIG. 1. Layers of material having a width of 5 cm and a height of 0.5 cm were applied. The geopolymer composition consisted of (raw materials as described above): 16.3 w % of GGBS, 9.4 w % of w-PC, 2 w % of MK, 5.8 w % of CSA, 0.5 w % of CaSO$_4$, 43 w % of sand, 16.7 w % of ground CaCO$_3$ (D50: appr. 30 μm), 5 w % of CaCO$_3$ fine filler (D50: 0.8 μm), 0.2 w % of PCE, and 1.1 w % additives (mixture of diutan gum and modified cellulose thickener, gluconate, and aluminium sulfate). A weight ratio of water to powder of 0.16 was used.

Visual inspection showed good printability evidenced by all of the following: individual layers show very limited sagging and no flow, adhesion between layers is good, a minimum of three layers could be applied on top of each other. Print time to build an object of 20 cm height was 13 min. Initial hose pressure was 200 psi, final hose pressure was 260 psi. Thus, a geopolymer composition according to the present invention showed smooth extrusion and excellent finish.

The 24 hour and 28 day strength of the printed object was high. Surprisingly, it was higher as compared to an object printed with conventional cementitious 3D printing inks.

The invention claimed is:

1. A cementitious binder for geopolymers, the cementitious binder comprising in each case relative to the total dry weight of cementitious binder
   a) not less than 30 w % of a mixture of at least two chemically different aluminosilicates, wherein a first aluminosilicate is steelmaking slag and further aluminosilicates are selected from fly ash of class F according to ASTM C618 and/or calcined clay, and wherein a weight ratio of the steelmaking slag to the fly ash, if present, is from 1.5:1 to 1:2 and a weight ratio of the steelmaking slag to the calcined clay, if present, is from 2:1 to 5:1,
   b) not less than 20 w % of Ordinary Portland cement, wherein a weight ratio of the Ordinary Portland Cement to the mixture of the at least two chemically different aluminosilicates is from 0.3 to 2, and
   c) 8-20 w % of a mixture of calcium sulfoaluminate cement or calcium aluminate cement with a source of calcium sulfate, wherein in the mixture the weight ratio of calcium sulfate to calcium sulfoaluminate and/or calcium aluminate is from 0.6 to 1.5.

2. A cementitious binder as claimed in claim 1, wherein the at least two chemically different aluminosilicates are selected from the steelmaking slag and the fly ash of class F according to ASTM C618.

3. A cementitious binder as claimed in claim 1, wherein the at least two chemically different aluminosilicates are selected from the steelmaking slag and the calcined clay.

4. A cementitious binder as claimed in claim 1, wherein the cementitious binder additionally comprises from 5 to 15 w % of silica fume, relative to the total dry weight of cementitious binder.

5. A cementitious binder as claimed in claim 1, wherein silica fume, the calcined clay, and the fly ash of class F according to ASTM C618 are present and wherein a weight ratio of the sum of the silica fume and the calcined clay to the fly ash is from 0.1 to 0.5.

6. A cementitious binder as claimed in claim 1, wherein the steelmaking slag is ground granulated blast furnace slag.

7. A cementitious binder as claimed in claim 1, wherein the source of calcium sulfate is anhydrite.

8. A geopolymer composition comprising
   a) the cementitious binder as claimed in claim 1,
   b) aggregates and/or fillers,
   c) optionally further additives.

9. A method for repair of concrete or mortar structures or of masonry, the method comprising the steps of
   a) providing the cementitious binder according to claim 1 or a geopolymer comprising the cementitious binder according to claim 1, further comprising aggregates and/or fillers, and optionally further additives,
   b) mixing the cementitious binder or the geopolymer composition provided in step a) with water,
   c) applying the mixture obtained in step b) to the surface of a hardened concrete or mortar structure, and
   d) optionally hardening the applied mixture.

10. A method for protection of a structure, the method comprising the steps of
   a) providing the cementitious binder according to claim 1 or a geopolymer comprising the cementitious binder according to claim 1, further comprising aggregates and/or fillers, and optionally further additives,
   b) mixing the cementitious binder or the geopolymer composition provided in step a) with water,
   c) applying the mixture obtained in step b) to the surface of the hardened structure, and
   d) optionally hardening the applied mixture.

11. A method for waterproofing of a structure, the method comprising the steps of
   a) providing the cementitious binder according to claim 1 or a geopolymer comprising the cementitious binder according to claim 1, further comprising aggregates and/or fillers, and optionally further additives,
   b) mixing the cementitious binder or the geopolymer composition provided in step a) with water, c) applying the mixture obtained in step b) to the surface of the hardened structure, and d) optionally hardening the applied mixture.

12. A method for 3D printing of a mortar composition, the method comprising the steps of a) providing the cementitious binder according to claim 1 or a geopolymer comprising the cementitious binder according to claim 1, further comprising aggregates and/or fillers, and optionally further additives, b) mixing the cementitious binder or the geopolymer composition provided in step a) with water, and optionally conveying the mixture obtained in step b) to a print head, c) applying the mixture obtained in step b) from the print head layer by layer to form a 3 dimensional object, and d) optionally hardening the 3 dimensional object.

13. A method for shotcreting, the method comprising the steps of a) providing the cementitious binder according to claim 1 or a geopolymer comprising the cementitious binder according to claim 1, further comprising aggregates and/or fillers, and optionally further additives, b) mixing the cementitious binder or the geopolymer composition provided in step a) with water, c) conveying the mixture obtained in step b) to a gun, d) optionally intermixing an additional accelerator to the mixture obtained in step b), e) spraying the mixture from the gun into a cavity and/or onto a surface, and f) optionally hardening the applied mixture.

\*　\*　\*　\*　\*